US011892854B2

(12) United States Patent
Tseng et al.

(10) Patent No.: US 11,892,854 B2
(45) Date of Patent: Feb. 6, 2024

(54) ASSISTANCE SYSTEM FOR CORRECTING VESSEL PATH AND OPERATION METHOD THEREOF

(71) Applicant: SHIP AND OCEAN INDUSTRIES R&D CENTER, New Taipei (TW)

(72) Inventors: Chun-Shun Tseng, New Taipei (TW); I-Hsiang Chen, New Taipei (TW); Yi-Pin Kuo, New Taipei (TW)

(73) Assignee: SHIP AND OCEAN INDUSTRIES R&DCENTER, New Taipei (TW)

( * ) Notice: Subject to any disclaimer, the term of this patent is extended or adjusted under 35 U.S.C. 154(b) by 241 days.

(21) Appl. No.: 17/405,976

(22) Filed: Aug. 18, 2021

(65) Prior Publication Data
US 2022/0179431 A1    Jun. 9, 2022

(30) Foreign Application Priority Data

Dec. 4, 2020    (TW) .................................. 109142731

(51) Int. Cl.
*G06F 17/00*    (2019.01)
*G05D 1/02*    (2020.01)
(Continued)

(52) U.S. Cl.
CPC .......... *G05D 1/0251* (2013.01); *B60K 35/00* (2013.01); *B60R 1/00* (2013.01); *B60K 2370/166* (2019.05); *B60R 2300/30* (2013.01)

(58) Field of Classification Search
CPC .... G05D 1/0251; G05D 1/0206; B60K 35/00; B60K 2370/166; B60K 2370/152;
(Continued)

(56) References Cited

U.S. PATENT DOCUMENTS 5,006,988 A * 4/1991 Borenstein ........... G05D 1/0255
701/25
6,469,664 B1 * 10/2002 Michaelson ......... G01C 13/008
367/909
(Continued)

FOREIGN PATENT DOCUMENTS

CN    105241457 A    1/2016
CN    111373283 A    7/2020
(Continued)

OTHER PUBLICATIONS

Data Collection for Career Path Prediction Based on Analysing Body of Knowledge of Computer Science Degrees (Year: 2018).*
(Continued)

*Primary Examiner* — Ronnie M Mancho
(74) *Attorney, Agent, or Firm* — Cheng-Ju Chiang (57) ABSTRACT

The assistance system for correcting vessel path comprises a receiver, a memory, at least one sensor, a processor and a display. The processor connects to the receiver, the memory and the at least one sensor, and the display is coupled to the processor. The assistance system based on the processor is able to be utilizing the preset machine-readable grid in determining the distance parameters of obstacles above water, and in which these distance parameters are corrected by using the sensor measurement data acquired by the at least one sensor. Thereby the assistance system could finish the distance measurements of abovementioned obstacles without using Lidar, and even in the case of high-undulating water surface.

8 Claims, 5 Drawing Sheets

(51) Int. Cl.
  *B60K 35/00* (2006.01)
  *B60R 1/00* (2022.01)
(58) Field of Classification Search
  CPC ........ B60K 2370/167; B60K 2370/178; B60K 2370/179; B60R 1/00; B60R 2300/30; G01C 21/203; B63B 43/20; B63B 49/00
  USPC .......................................................... 701/516
  See application file for complete search history.

(56) References Cited

U.S. PATENT DOCUMENTS

| | | | | |
|---|---|---|---|---|
| 8,469,274 | B2* | 6/2013 | Tseng ..................... | G06V 10/25 235/462.01 |
| 8,983,205 | B2* | 3/2015 | Tseng ..................... | G06T 7/246 382/199 |
| 9,706,176 | B2* | 7/2017 | Longobardi ............ | G06T 11/00 |
| 10,579,065 | B2* | 3/2020 | Wang ..................... | G05D 1/0274 |
| 11,016,492 | B2* | 5/2021 | Gier ....................... | G05D 1/0088 |
| 11,307,413 | B2* | 4/2022 | Cormier ................. | G06F 1/163 |
| 11,512,940 | B2* | 11/2022 | Hornung ................ | G06T 7/521 |
| 11,530,921 | B2* | 12/2022 | Nimmagadda ...... | G08G 5/0021 |
| 11,643,011 | B2* | 5/2023 | Lang ..................... | H04N 5/2628 348/148 |
| 2006/0215020 | A1* | 9/2006 | Mori ....................... | B60R 1/00 348/148 |
| 2009/0132161 | A1* | 5/2009 | Akita ................. | G01C 21/3647 701/532 |
| 2015/0153376 | A1* | 6/2015 | Preston ................ | B60W 40/114 702/141 |
| 2016/0016646 | A1 | 1/2016 | Mun et al. | |
| 2017/0285645 | A1* | 10/2017 | Nakagawa ........... | G01S 13/937 |
| 2017/0372431 | A1* | 12/2017 | Perl ........................ | G06Q 40/08 |
| 2019/0184900 | A1* | 6/2019 | Lang ........................ | B60R 1/00 |
| 2020/0099824 | A1* | 3/2020 | Benemann ........... | H04N 23/689 |
| 2020/0125861 | A1* | 4/2020 | Sota ...................... | B62D 15/025 |
| 2020/0380274 | A1* | 12/2020 | Shin ....................... | G06V 20/58 |
| 2022/0171062 | A1* | 6/2022 | Hsu ....................... | G01S 7/4808 |
| 2022/0179431 | A1* | 6/2022 | Tseng ................... | G05D 1/0251 |

FOREIGN PATENT DOCUMENTS

| | | | | |
|---|---|---|---|---|
| DE | 102017130566 A1 | * | 6/2019 | ............ B60K 35/00 |
| EP | 3225534 A1 | * | 10/2017 | ............ B63H 23/08 |
| EP | 3530521 A1 | * | 8/2019 | .............. B60R 1/00 |
| JP | 2013-92820 A | | 5/2013 | |
| JP | 2013092820 A | * | 5/2013 | |
| KR | 10-2018-0046803 A | | 5/2018 | |
| KR | 10-2020-0027871 A | | 3/2020 | |
| TW | 202035947 A | | 10/2020 | |

OTHER PUBLICATIONS

Roboat: An Autonomous Surface Vehicle for Urban Waterways (Year: 2019).*

* cited by examiner

ASSISTANCE SYSTEM FOR CORRECTING VESSEL PATH AND OPERATION METHOD THEREOF

TECHNICAL FIELD

The present invention is an assistance system for correcting path and operation method thereof. Specifically, this invention indicates an assistance system for correcting vessel path used for ship and boat.

BACKGROUND OF RELATED ARTS

Route planning is a basic problem in the control of unmanned surface vehicles. The central computer fully specifies the route path that the unmanned surface vehicle should follow from the beginning of the navigation to the target. The route path must usually not collide with any obstacles in the navigation environment and reduce the possibility of collision as well.

The LiDAR technology has been widely used in distance detection. Unmanned surface vehicles usually use LiDAR to detect the scene above the water. However, when the LiDAR is used on the surface of the water, it is often affected by water surface interference factors such as light reflection on the water surface, undulation or moisture, etc., reducing measurement accuracy and practicability per se. Therefore, the use of LiDAR on water surface usually needs to be supplemented by other measurement methods.

Comparing to LiDAR, image measurement by object deep learning/recognition/affine transformation techniques is relatively less affected by the environment. However, due to the ups and downs of the water surface, in case of a sudden encounter with a large height difference on the water surface, the obstacles will swing up and down because of the height difference, which will cause serious deviations in image measurement and affect the safety of unmanned surface vehicles. For example, the position or shape characteristics of obstacles may change over time in a shot image/video (large floating obstacles may be displaced based on the direction of water flow). Therefore, the challenge of route planning is about the processing speed of image measurement must be real-time and can be monitored by the user. While confirming the route path of the unmanned surface vehicle, the user can simultaneously monitor the route based on the images of the actual sailing environment and perform real-time correction/adjustment of the route path according to the instant situation.

SUMMARY

To resolve the drawbacks of the prior arts, the present invention discloses an assistance system for correcting vessel path and operation method thereof. Specifically, this invention indicates an assistance system for correcting vessel path used for ship and boat. The advantage of the present invention is to instantly display the distance of the obstacle in the video of the detecting environment. Specifically, the present invention uses the preset machine-readable grid to determine the distance information of the obstacle, and confirms and corrects the distance information according to the sensing data of sensors so as to correct the distance information (the deviation caused by the environment is eliminated). Therefore, the present invention completes the distance measurement of the obstacle without using LiDAR. In addition, the present invention is able to be used in undulating waters (such as the sea).

At least one embodiment of the present invention is about an assistance system for correcting vessel path which comprises a receiver, a memory, at least one sensor, a processor and a display. The processor is connected with the receiver, the memory and the at least one sensor. On the other hand, the display is also connected to the processor.

Furthermore, at least one embodiment of the present invention is about an operation method of the assistance system for correcting vessel path comprises the following steps. First of all, step (A) provides the abovementioned assistance system for correcting vessel path. Step (B) is that the at least one recording device captures a scene which comprises at least one obstacle, generating the at least one image data. In step (C), the processor analyzes the at least one image data and the at least one machine-readable grid and estimates the distance information of any of the obstacles in the scene. Step (D) is that the processor corrects the at least one distance information via the sensing data which is provided by the at least one sensor. Step (E) uses the processor for correcting the at least one distance information which has been firstly observed via a correcting information. At last, step (F) shows that the display displays the at least one assistance image. In steps (A) to (F), the at least one assistance image comprises at least one tag and the at least one tag shows the at least one distance information which is corrected or uncorrected.

The abovementioned summary of the present disclosure relates to provide a basic description of the various aspects and features of the invention. The invention is not to be construed as being limited to the details of the present disclosure.

DETAILED DESCRIPTION OF THE INVENTION

To clarify the purpose, technical solutions, and the advantages of the present invention, embodiments of the present invention will now be described more fully hereinafter with reference to the accompanying drawings.

At least one embodiment of the present invention discloses an assistance system for correcting vessel path and operation method thereof. Specifically, this invention indicates an assistance system for correcting vessel path used for ship and boat.

Figure 1:
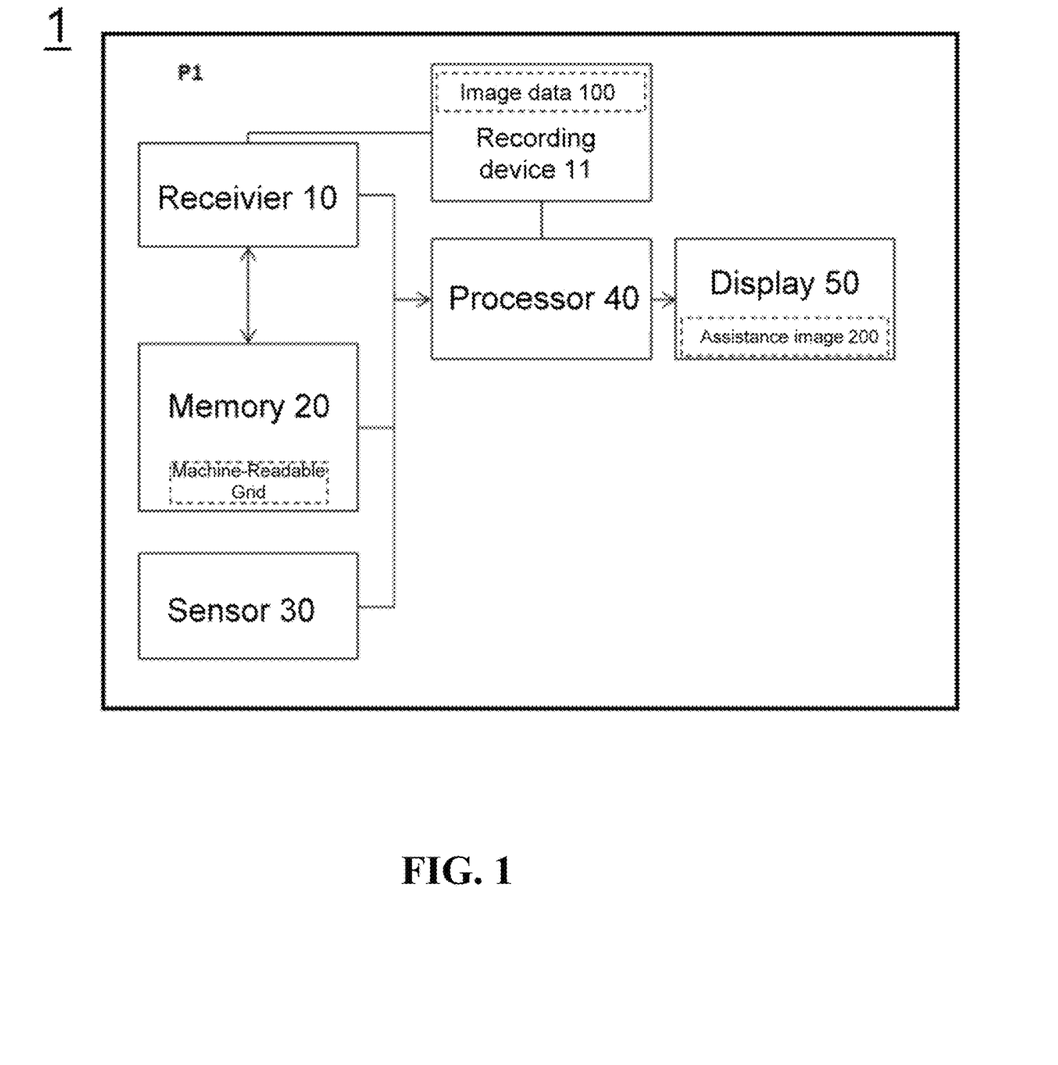
FIG. 1 is a structural schematic diagram of the assistance system for correcting vessel path of the present invention.
Figure 2:
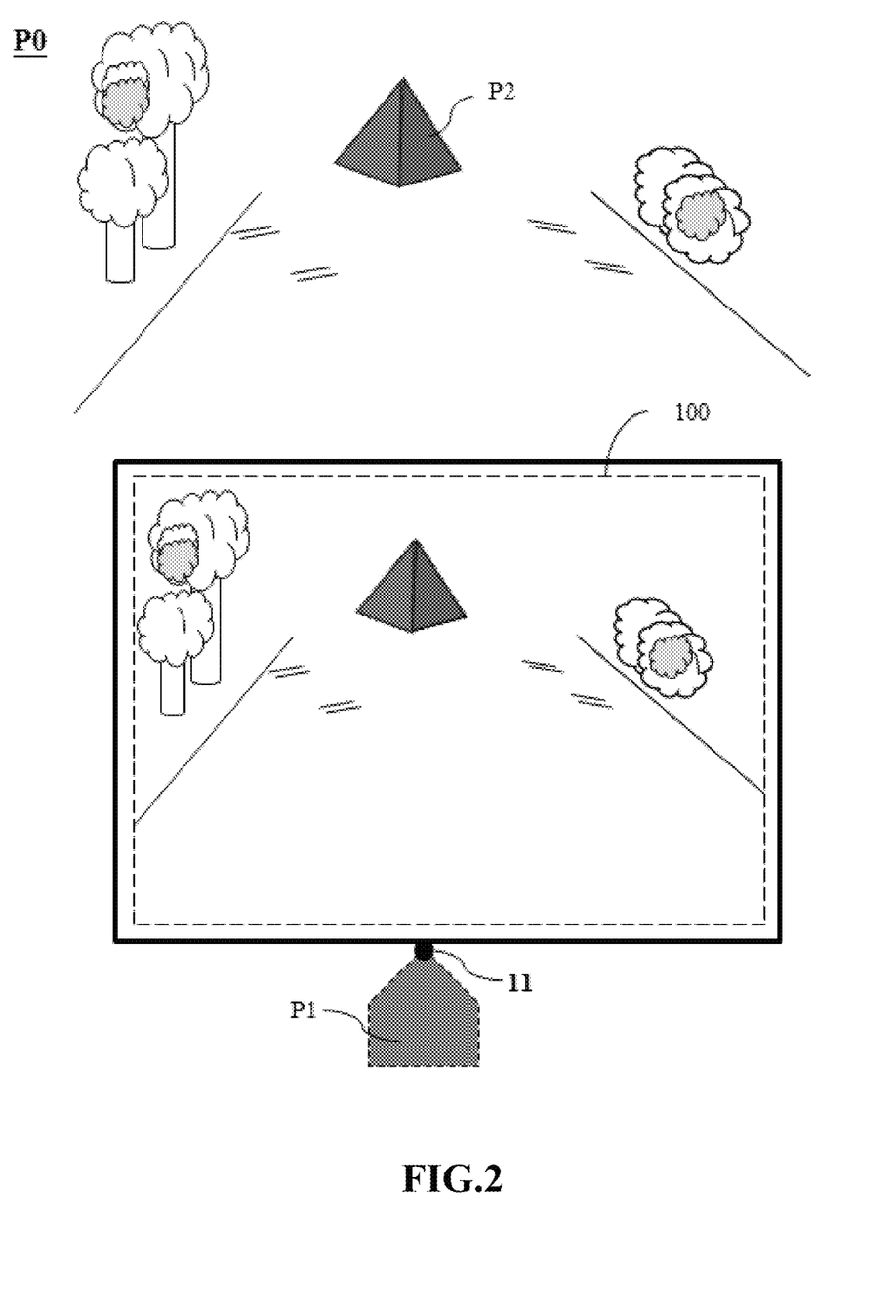
FIG. 2 is a schematic diagram of scene of an embodiment of the present invention.

Please refer to FIG. 1 and FIG. 2 simultaneously. FIG. 1 is a structural schematic diagram of the assistance system for correcting vessel path of the present invention. FIG. 2 is a schematic diagram of scene of an embodiment of the present invention. As shown in FIG. 1, the assistance system for correcting vessel path 1 is configured in transportation P1. The assistance system for correcting vessel path 1 comprises receiver 10, memory 20, at least one sensor 30, processor 40 and a display 50. The processor 40 is connected with the receiver 10, memory 20, display 50 and at least one sensor 30. The receiver 10 recited in FIG. 1 is configured to receive at least one image data 100 via at least one recording device 11, and alternatively saves or directly sends the at least one image data 100 to memory 20 or processor 40 respectively.

In the embodiments of FIG. 1 and FIG. 2, the transportation P1 is speedboats, fishing boats, sightseeing boats and other small water vehicles. Furthermore, the transportation P1 may be unmanned ships (such as battleships, cruise ships and other large water vehicles), the present invention is not limited thereto. The recording device 11 can be a digital video recorder (DV), a digital still camera (DSC), a digital video recorder (DVR) or other electronic equipment/camera system with a video recording function. The recording device 11 captures and outputs image data 100 including at least one image of obstacle P2. The Obstacle P2 refers to any static/dynamic obstacle in open/closed water fields. This embodiment does not specifically limit the number of recording devices 11 shall be one or more. In this embodiment, an appropriate number of recording devices 11 is determined according to the size of the transportation P1. In the following embodiment, the number of recording device 11 is one, and the recording device 11 is installed on the bow of transportation P1. Recording device 11 represents the shortest distance between transportation P1 and obstacle P2 in the sailing direction. Therefore, the processor 40 only needs to obtain the location information of the recording device 11 and the shortest distance between obstacle P2 and transportation P1 can be calculated.

Sensor(s) 30 of FIG. 1 and FIG. 2 is configured inside/around the transportation P1 and detects the operating situation (e.g. inclination or speed) of transportation P1. Moreover, sensor(s) 30 helps/recheck the detection of the distance between transportation P1 and obstacle P2. Please notice that the sensor 30 described in this embodiment is selected from tilt sensor or acceleration sensor, however being not limited to the present invention. The type of sensor 30 is also can be selected from strain gauge, displacement sensor, light sensor, rotation sensor, angular sensor or angular velocity sensor for generating different data. The above mentioned data generated by sensor(s) 30 is defined as sensing data in this embodiment.

On the other hand, the memory 20 is set to store at least on machine-readable grid, and processor 40 is used to read and execute this machine-readable grid. Hence, the type and data form of memory 20 shall be recognized by processor 40. The actual device of memory 20 is volatile memory, non-volatile memory, magnetic memory, semiconductor memory, optical memory, removable memory, non-removable memory, or combinations thereof. Specifically, the memory 20 is a large-capacity memory module, the present invention is not limited thereto.

The processor 40 is able to be connected/coupled with receiver 10 and memory 20 thus to execute the commands saved in memory 20. The processor 40 is configured to read or write variable types of data via wire or wirelessly of the memory 20. For instance, the aforementioned variable types of data are helpful for the operation of the assistance system for correcting vessel path 1 such as one or more sensing data, distance information, image data 100 or machine-readable grid.

As shown in FIG. 1 and FIG. 2, the processor 40 is configured to analyze image data 100 and said machine-readable grid, estimating the distance information of any obstacle P2 in current image data 100. Considering the numbers and types of sensing data, the processor also decides to correct the distance information or not. The decision of processor 40 will be show on display 50 as the assistance image 200. The presentation of assistance image 200 shows distance information of every obstacle P2, no matter the distance information is corrected or uncorrected by processor 40. Users can easily understand the distance, level of inclination, acceleration and relative direction/position of/between transportation P1 and obstacle P2. The machine-readable grid is executed by processor 40 for defining several zones having constant length and width of image data 100, therefore to estimate the length, width or distance of obstacle P2. In other words, the machine-readable grid is configured to illustrate the position coordinate of recording device 11 and any obstacles P2. The aforementioned constant length and width of zones of image data 100 are able to be designed as the same as the average value between two relative points of transportation P1.

The present embodiment does not define the type of processor 30 and display 50. However, the person having ordinary skill in the art should understand that the processor 40 is able to be MCU or the other known configurations of processor, controller or calculator. The display 50 is the computer display, television, VR or projector.

To clarify the operation method of the embodiment of the present invention, please refer to FIG. 1 to FIG. 5.

Figure 3:
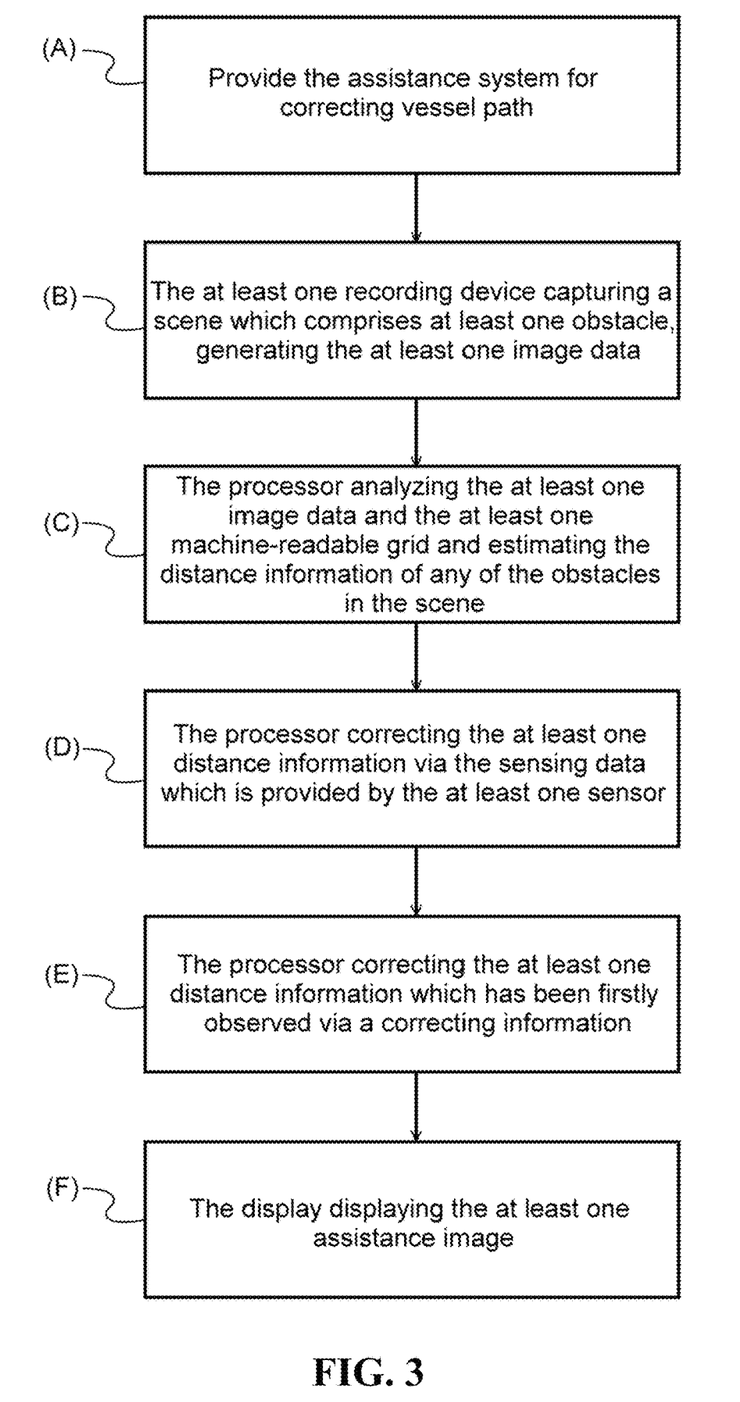
FIG. 3 is a flow chart of the embodiment of the present invention.

Please refer to FIG. 3 with FIG. 1 and FIG. 2, FIG. 3 is a flow chart of the embodiment of the present invention. The method illustrated in FIG. 3 provides an assistance system for correcting vessel path. First of all, step (A) provides an assistance system for correcting vessel path as described in FIG. 1. Step (B) is that the recording device 11 captures a scene P0 which comprises at least one obstacle P2, thus generates the image data 100. In step (C), the processor 40 analyzes the image data 100 and machine-readable grid and estimates the distance information of every obstacle P2 in scene P0. The abovementioned distance information is used to represent the relative position between each obstacle P2 and recording device 11, featuring the shortest distance between obstacle P2 and transportation P1. Step (D) is that the processor 40 corrects the distance information via the sensing data which is provided by the sensor(s) 30. Step (E) uses the processor 40 for correcting the distance information which has been firstly observed via correcting information. At last, step (F) shows that the display 50 displays the assistance image 200. The assistance image 200 comprises at least one tag. This tag shows the distance information which is corrected or uncorrected. Specifically, if the distance information is uncorrected (means that the distance information is originally correct), the step (D) may be bypassed and step (F) will be just executed.

The step (B) of present embodiment comprises an alternative step (B1). The processor 40 detects the existence of obstacle P2 in scene P0. If obstacle P2 is detected, the recording device 11 captures (records) the scene P0 and outputs image data 100 to receiver 10. In the embodiment of step (B1), the sensor 30 comprises the optical sensing element and provides the related data for processor 40. Hence the processor 40 is able to detect the obstacle P2 which exists in scene P0. For example, the optical sensing element of sensor 30 receives the reflection of light of obstacle P2 in scene P0. The result of this mechanism assists the processor 40 to check the existence of obstacle P2. In this embodiment, the optical sensing element is Charge-coupled Device (CCD), Complementary Metal-Oxide-Semiconductor (CMOS) or the other light sensing unit.

Furthermore, the step (B1) may alternatively comprise the step (B11). In the embodiment which comprises step (B11), the processor 40 checks the obstacle P2 in scene P0 is able to fulfill an expected requirement or not. The expected requirement of the present embodiment is to check the quality of image resolution of obstacle P2 is higher than a critical value and being recognizable or not. It is to say that the expected requirement of this embodiment is decided by the number of pixels of the obstacle P2 which is captured by recording device 11. On the other hand, the design of critical value is a pixel number threshold which is user programmable and determined by the performance of processor 40. Therefore, the processor 40 confirms that the expected resolution of any obstacle P2 is higher or equal to the critical value; the scene P0 will be eligible to generate image data 100. However, the processor 40 confirms that the expected resolution of any obstacle P2 is lower to the critical value, the scene P0 will be discard and go back to step (B1).

In the present embodiment, the step (C) further comprises steps (C1) to (C3). These steps use processor 40 to calculate every obstacle P2 shown in image data 100 individually. The step (C1) is to set a first reference point which represents the recording device 11 and sets a second reference point which represents the transportation P1 via the first reference point on the machine-readable grid relatively. The step (C2) is to feature each obstacle P2 in the image data 100 and reflect the target point of the obstacle P2 on the machine-readable grid. The step (C3) is to calculate the distances between the target point, at least one first reference point and at least one second point and generate the distance information of the obstacle P2. The abovementioned steps (C1)-(C3) are able to be calculated by using trigonometric algorithm and the steps (C2) and (C3) are repeated until all of the distance information of the obstacle P2 is generated. On the other hand, the execution of steps (C1)-(C3) may also use iterative calculation.

The features of obstacle P2 featured in step (C2) are captured by the at least one possible closest point of edge or ends of the image of obstacle P2. The closest points mentioned here are potential collision points (the edge points) simulated by processor 40 via the position of actual end points of transportation P1 and different distance between transportation P1 and obstacle P2. The information of the position of actual end points of transportation P1 is preset or calculated via the iterative calculation such as Python™. The end point of the edge of the obstacle P2 can be determined by the same method.

The target point mentioned in step (C2) is individual feature point cited as a relative coordinate on the machine-readable grid via transformation matrix. The transformation matrix is indicated to the related position of every obstacle P2 represented in image data 100. The transformation matrix may be saved in memory 20 or generated by processor 40 via the variants of the obtained relative positions between transportation P1 and obstacles P2.

The step (D) is related to check the object which needs correction (thus the distance information needs to be corrected). The step (D) of the present embodiment further comprises steps (D1)-(D2). The step (D1) make the processor 40 check a first tilt data and a second tilt data are over a first threshold and a second threshold respectively. If any of the first tilt data or the second tilt data is over or equal to the first threshold or the second threshold, all of the distance information of the image data is required to be corrected. In step (D2), the processor 40 generates the correcting information via the first tilt data and the second tilt data. In this embodiment, the correcting information is obtained by the cross product of the first tilt data and the second tilt data. Moreover, the present invention also can obtain the correcting information via using specific models to calculate the first tilt data and the second tilt data, this invention is not limited thereto. The first threshold and the second threshold are preset by actual requirement. For instance, if the first tilt data is about a rolling level of transportation P1, the first threshold will be preset as the anti-rolling level of the recording device 11. The second tilt data and the second threshold are vice versa. Therefore, the rolling level may be defined and replaced by a pitching level, regarding to the water conditions which the transportation P1 is sailing/may sail.

If the sensor 30 comprises a timer, a step (D3) can be executed between the step (D1) and (D2). The step (D3) is that the processor 40 monitors and checks the duration time of the first tilt data and the second tilt data is over an allowance value or not. If the duration time is not over the allowance value, the distance information will be uncorrected (bypass step (D2)) then processing to the step (F), which the processor 40 outputs the assistance image 200 generated by step (C) to display 50. The user is able to check said assistance image 200. The allowance value of the duration time is determined by the adaptive algorithm of recording device 11. The definitions of allowance value also can be determined by actual conditions such as the speed of wind or flow, the present invention is not limited thereto.

In the other possible embodiment, the required correcting information of transportation P1 may be changed in different situation such as the transportation P1 is sailing on the surface of sea. The steps (D1)-(D2) can be bypassed and chosen to execute the steps (E1)-(E4) of step (E). In step (E1), the processor 40 generates a first horizontal line and a second horizontal line via a preset standard image and image data 100 respectively. The step (E2) is that the processor 40 merges the image data 100 and the standard image therefore to form a fusion data. This fusion data comprises the information of first horizontal line and second horizontal line simultaneously. In further step (E3), a simulation unit of the processor 40 projects the marks to the first horizontal line and the second horizontal from a certain point, forming a criterion mark (first horizontal line) with a shifting distance and a correcting mark (the second horizontal line). Finally, step (E4) make the processor 40 calculates the different value between the criterion mark and the correcting mark thus to form the correcting data.

Figure 4:
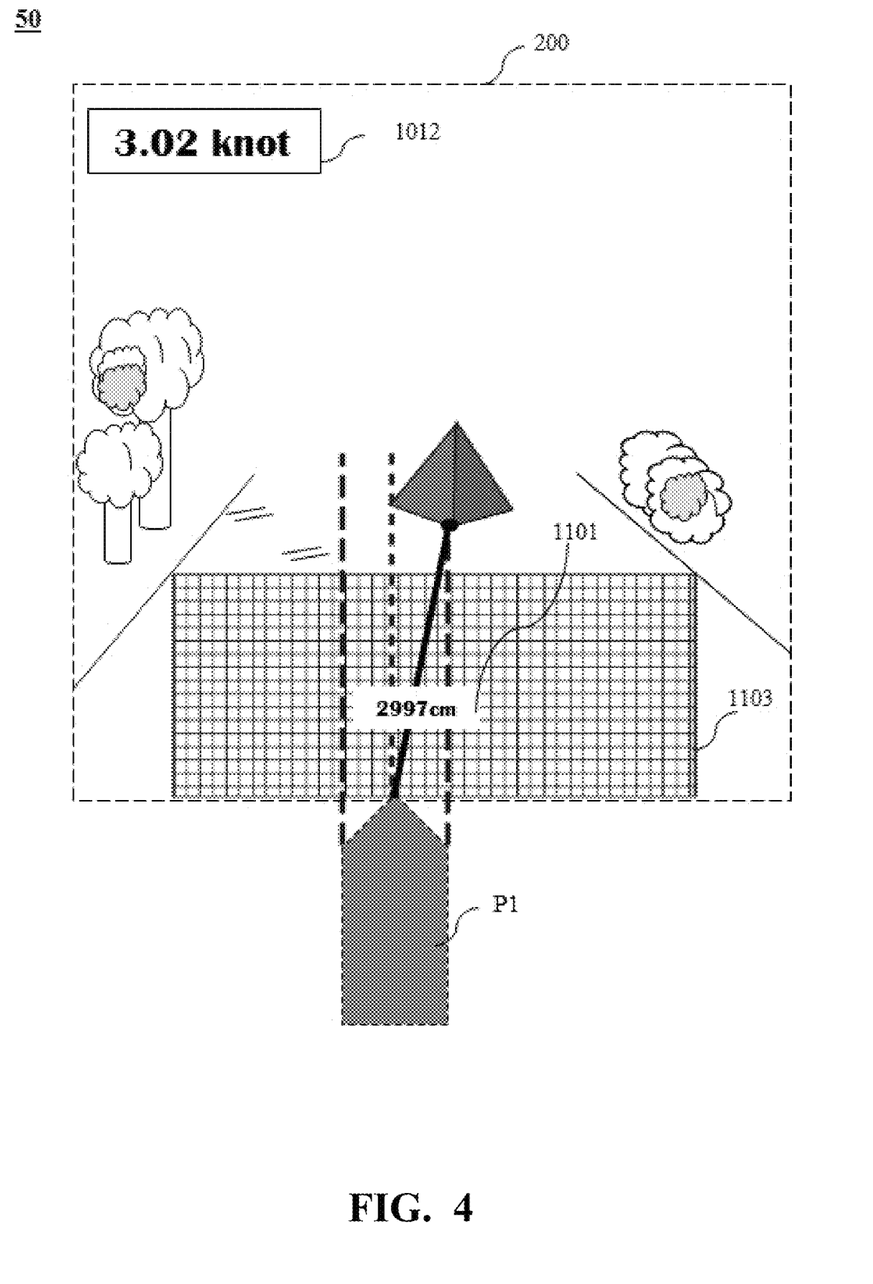
FIG. 4 is a schematic diagram describing the output of an image data of an embodiment of the present invention.
Figure 5:
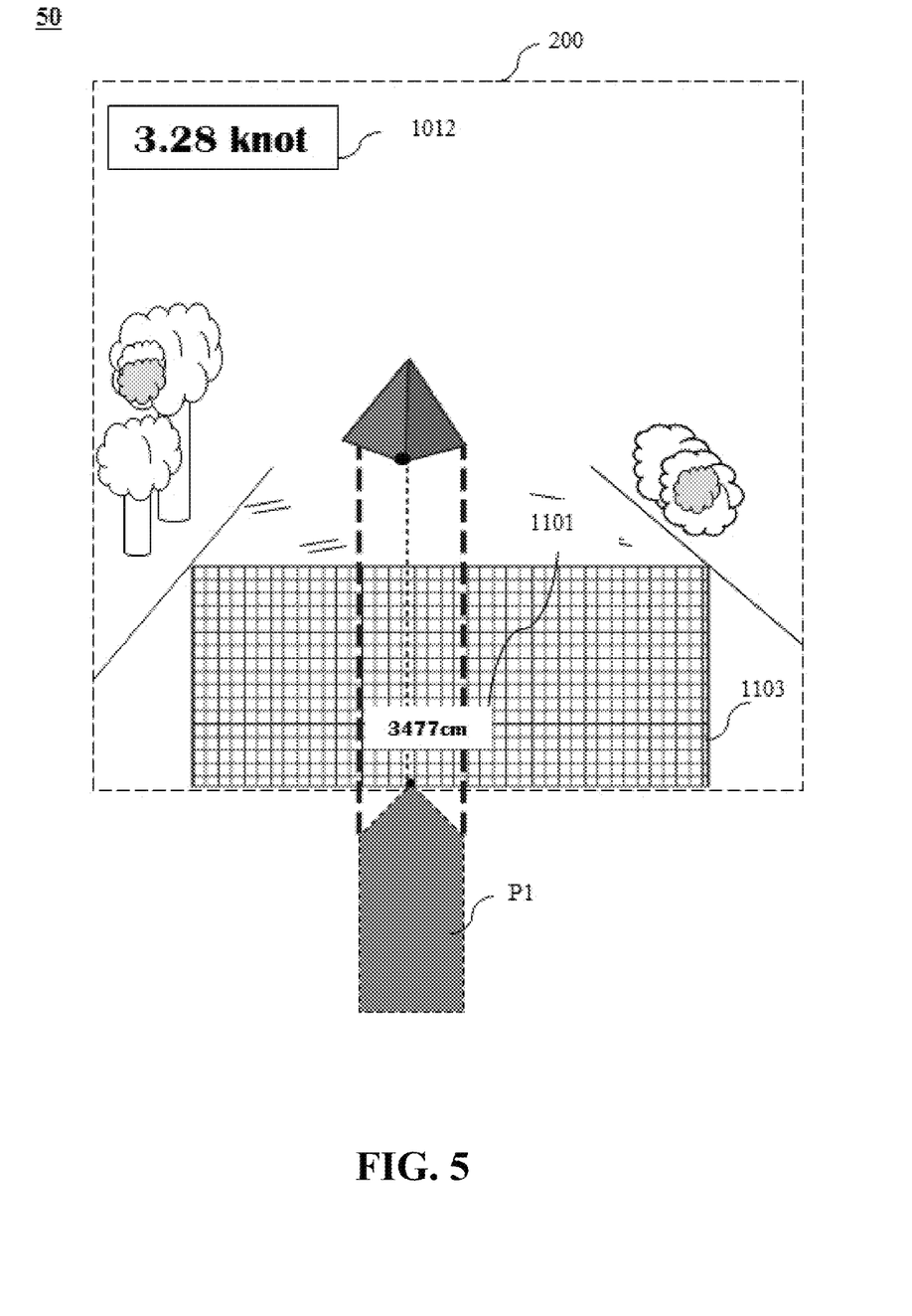
FIG. 5 is the other schematic diagram describing the output of an image data of an embodiment of the present invention.

Please refer to FIG. 4 and FIG. 5 via FIG. 2 and FIG. 3. FIG. 4 and FIG. 5 are schematic diagrams describing the output of assistance image 200 of the present embodiment. The embodiment shown in FIG. 4 is used in near filed detecting situation, and the embodiment of FIG. 5 is used in the distal field detecting situation. The detecting mode is decided by the detected distance of obstacle P2. However, the definitions of near field, medium filed or the distal field do not mean certain distances and just represent the relative distance between the transportation P1 and obstacle P2. Considering with the present embodiment is used by an unmanned surface vehicle, the disturbance of the water surface frequently happens. Therefore, the scene P0 shall be the same as the actual sailing environment and be able to correct the route or path of transportation P1. In addition, in order to improve the efficiency of monitoring, the display 50 of the present embodiment displays the assistance image 200 which comprises tags. These tags reflect the output information from processor 40 such as distance information. In fact, before the execution of step (E), processor 40 use distance information to generate the related tags and input these tags into image data 100, forming assistance image

200 which is displayed on display 50. That is, the potential collision will be noticed by the tags which are determined by distance data.

In the embodiments of FIG. 4 and FIG. 5, each tag comprises an object information 1101 and a vessel information 1012. In the other embodiment, the tag is configured to alternatively comprise grid information 1103. The object information 1101 may be a group of the distance information between any of obstacle P2 to the transportation P1 (unit: cm) and the relative direction of obstacle P2 to the transportation P1. The vessel information 1012 is the current speed of transportation P1 (unit: knot). The grid information is the visual form of the abovementioned machine-readable grid.

The tag mentioned here also can alternatively display the other information. For example, the detected range of sensor 30 or the silhouette of obstacle P2. To efficiently recognize the tag, the processor 40 is able to color the object information 1101, vessel information 1012 and the grid information 1103 by the attributes per se. For instance, if the object information 1101 shows the medium to near filed, the red colored tag will be noticed. On the other hand, the grid information 1103 colors the edge of collision (linear extension of transportation P1) via yellow color. The attributes of object information 1101 can be defined as near field or distal field. The attributes of vessel information 1102 can be defined as idle speed or over speed. The present invention is not limited thereto. Moreover, the relationship between the attributes and colors also can be preset by a table.

As understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. An assistance system for correcting vessel path, comprising:
    a receiver, receiving at least one image data from at least one recording device, the at least one recording device is onboard a vessel;
    a memory, saving at least one machine-readable grid;
    at least one sensor, detecting an operating situation of the vessel and generating at least one sensing data;
    a processor, connecting to the receiver, the memory and the at least one sensor; and
    a display, connecting to the processor and displaying an assistance image;
    wherein the processor generates at least one distance information via the at least one image data and the at least one machine-readable grid, and determines correction of the at least one distance information via the at least one sensing data.

2. The assistance system for correcting vessel path as claimed in claim 1, wherein the at least one sensor is tilt sensor, acceleration sensor or combinations thereof.

3. An operation method of assistance system for correcting vessel path, comprising:
    (A) providing an assistance system for correcting vessel path;
    (B) at least one recording device capturing a scene which comprises at least one obstacle, generating at least one image data;
    (C) a processor analyzing the at least one image data and at least one machine-readable grid and estimating at least one distance information of any of the at least one obstacles in the scene;
    (D) the processor correcting the at least one distance information via sensing data which is provided by at least one sensor;
    (E) the processor correcting the at least one distance information which has been firstly observed via a correcting information; and
    (F) the display displaying at least one assistance image;
    wherein the at least one assistance image comprises at least one tag;
    wherein the at least one tag shows the at least one distance information which is corrected or uncorrected.

4. The operation method of assistance system for correcting vessel path as claimed in claim 3, wherein the step (B) further comprises: step (B1) the processor detecting existence of the at least one obstacle in the scene, if the at least one obstacle exists then the at least one recording device captures the scene and outputs at least one image data to the receiver.

5. The operation method of assistance system for correcting vessel path as claimed in claim 4, wherein the step (B1) further comprises: step (B11) the processor checking whether the at least one obstacle in the scene is able to fulfill an expected requirement or not, if the expected requirement is fulfilled by the at least one obstacle, the processor generates the at least one image data via the scene; wherein the expected requirement is image resolution recognizability of the at least one obstacle.

6. The operation method of assistance system for correcting vessel path as claimed in claim 3, wherein the step (C) further comprises:
    (C1) setting a first reference point which represents the recording device and setting a second reference point which represents the vessel via the first reference point on the at least one machine-readable grid relatively;
    (C2) featuring the at least one obstacle in the at least one image data and reflecting at least one target point of the at least one obstacle on the at least one machine-readable grid; and
    (C3) calculating distances between the at least one target point, at least one first reference point and at least one second point and generating the distance information of the at least one obstacle;
    wherein the steps (C2) and (C3) are repeated until all of the at least one distance information of the at least one obstacle is generated;
    wherein the steps (C1)-(C3) is executed by the processor.

7. The operation method of assistance system for correcting vessel path as claimed in claim 3, wherein the step (D) further comprises:
    (D1) the processor checking whether a first tilt data and a second tilt data of the at least one sensing data are over a first threshold and a second threshold respectively, if any of the first tilt data or the second tilt data is over the first threshold or the second threshold, all of the distance information of the at least one image data is required to be corrected; and
    (D2) the processor generates the correcting information via the first tilt data and the second tilt data.

8. The operation method of assistance system for correcting vessel path as claimed in claim 7, wherein a step (D3) is alternatively executed between the step (D1) and step (D2);

wherein step (D3) comprises: the processor monitoring the at least one sensing data and checking whether duration time of the first tilt data and the second tilt data is over an allowance value or not;

wherein if the duration time is not over the allowance value, the at least one distance information will be uncorrected then processing to the step (F).

* * * * *